(12) United States Patent
Deichman

(10) Patent No.: US 7,677,505 B2
(45) Date of Patent: Mar. 16, 2010

(54) ARCUATE SADDLE WITH PARTIAL RIBS

(76) Inventor: Mack Deichman, 113 5th St., Cambridge, IA (US) 50046

( * ) Notice: Subject to any disclaimer, the term of this patent is extended or adjusted under 35 U.S.C. 154(b) by 179 days.

(21) Appl. No.: 11/767,091

(22) Filed: Jun. 22, 2007

(65) Prior Publication Data

US 2008/0203239 A1 Aug. 28, 2008

Related U.S. Application Data

(60) Provisional application No. 60/891,098, filed on Feb. 22, 2007.

(51) Int. Cl.
*E21F 17/02* (2006.01)
(52) U.S. Cl. .................... 248/58; 285/197; 138/106
(58) Field of Classification Search ............... 248/49, 248/58, 317; 138/106, 107; 285/197
See application file for complete search history.

(56) References Cited

U.S. PATENT DOCUMENTS

| | | | |
|---|---|---|---|
| 1,079,759 A | 11/1913 | Gray | |
| 2,327,706 A | 8/1943 | Halstend | |
| 2,600,442 A | 6/1952 | Stanius | |
| 2,719,562 A | 10/1955 | Beegle | |
| 2,769,477 A | 11/1956 | Neer | |
| 3,040,799 A | 6/1962 | Hanson | |
| 3,150,707 A | 9/1964 | Howell | |
| 3,304,757 A | 2/1967 | Achler et al. | |
| 3,357,222 A | 12/1967 | Konstandt | |
| 3,485,076 A | 12/1969 | Colburn | |
| 3,535,903 A | 10/1970 | Abernathy | |
| 3,608,347 A | 9/1971 | Kemminer | |
| 3,610,011 A | 10/1971 | Valentine | |
| 3,622,184 A * | 11/1971 | Deasy et al. | 285/197 |
| 3,667,265 A | 6/1972 | Zippe | |
| 4,063,442 A | 12/1977 | Martin, Sr. | |
| 4,286,451 A | 9/1981 | Chang | |
| 4,777,816 A | 10/1988 | Inoue | |
| 4,804,158 A | 2/1989 | Collins et al. | |
| 5,058,931 A * | 10/1991 | Bowsher | 285/112 |
| 5,139,134 A | 8/1992 | Schenck | |
| 5,170,813 A * | 12/1992 | Francis | 137/15.13 |
| 5,192,039 A * | 3/1993 | Williams | 248/62 |
| 5,522,245 A | 6/1996 | Nozaki et al. | |

(Continued)

FOREIGN PATENT DOCUMENTS

JP  62-156025  7/1987

(Continued)

OTHER PUBLICATIONS

Operating And Instructions And Parts List For Your One-Pass Roll Bending Machine, Sep. 1994.

(Continued)

*Primary Examiner*—A. Joseph Wujciak, III
(74) *Attorney, Agent, or Firm*—Woodard, Emhardt, Moriarty, McNett & Henry LLP

(57) ABSTRACT

Embodiments of the present invention relate to arcuate saddles with partial ribs typically used to anchor and suspend insulated or non-insulated pipes. Partial ribs on the lower face of the saddle inhibit the saddle from sliding relative to the hanger when engaged and provide strengthening force to the saddle.

15 Claims, 9 Drawing Sheets

U.S. PATENT DOCUMENTS

| | | | |
|---|---|---|---|
| D398,048 S | 9/1998 | Casady et al. | |
| 5,848,770 A | 12/1998 | Oliver et al. | |
| 6,142,165 A * | 11/2000 | Wartel et al. | 137/15.13 |
| 6,224,025 B1 * | 5/2001 | Alvarez | 248/58 |
| 6,283,158 B1 | 9/2001 | Botsolas et al. | |
| 6,691,742 B1 * | 2/2004 | Cooper | 138/106 |
| 6,751,995 B1 | 6/2004 | Sabasta | |

FOREIGN PATENT DOCUMENTS

SU 494898 8/1987

OTHER PUBLICATIONS

Acrotech, Product Technical Bulletin, PTB-600, Oct. 5, 1994.

Cylinders In One Pass With Acrotech Roll Bending Machines For Precision And Production, CAT 800, Aug. 15, 1998.

Oliver, Dale, Understanding the Two-Roll Bending Process: An Alternative for Higher-Volume Production, The Fabricator, Jul. 1995, Lake City, Minnesota.

* cited by examiner

ARCUATE SADDLE WITH PARTIAL RIBS

This application claims the benefit of U.S. provisional application Ser. No. 60/891,098 filed on Feb. 22, 2007, which is hereby incorporated by reference.

BACKGROUND OF THE INVENTION

Aspects of the present invention relate generally to saddles for anchoring and supporting insulated and uninsulated pipes. Saddles are typically used in building construction to anchor and support pipes to suspend the pipes from the structure of the building. Saddles typically spread the force of a hanger across a portion of the pipe to minimize the force applied to a particular spot. Arcuate flat saddles and saddles with 180° arcuate ribs (FIG. 1) are well known in the art. An improved saddle is desired.

SUMMARY

Embodiments of the present invention relate to arcuate saddles with partial ribs typically used to anchor and suspend insulated or non-insulated pipes. Partial ribs on the lower face of the saddle inhibit the saddle from sliding relative to the hanger when engaged and provide strengthening force to the saddle.

In certain embodiments of the present invention, an arcuate saddle comprises a saddle which has a length and a width formed into an arc defined by a radius. The arcuate saddle further includes an exterior face on the saddle and a pair of partial ribs with closed ends protruding from the exterior face.

Objects, features and advantages of the present invention shall become apparent from the detailed drawings and descriptions provided herein.

DESCRIPTION OF PREFERRED EMBODIMENTS

For the purposes of promoting an understanding of the principles of the invention, reference will now be made to the embodiments illustrated and specific language will be used to describe the same. It will nevertheless be understood that no limitation of the scope of the invention is thereby intended, such alterations, modifications, and further applications of the principles of the invention being contemplated as would normally occur to one skilled in the art to which the invention relates.

Figure 2:
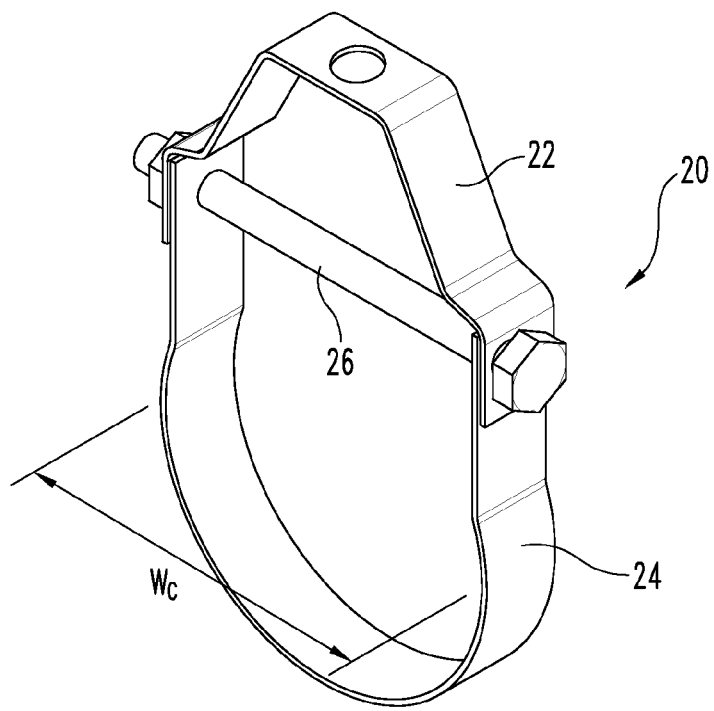
FIG. 2 is an example of a hanger assembly usable to suspend saddles according to embodiments of the present invention.
Figure 3:
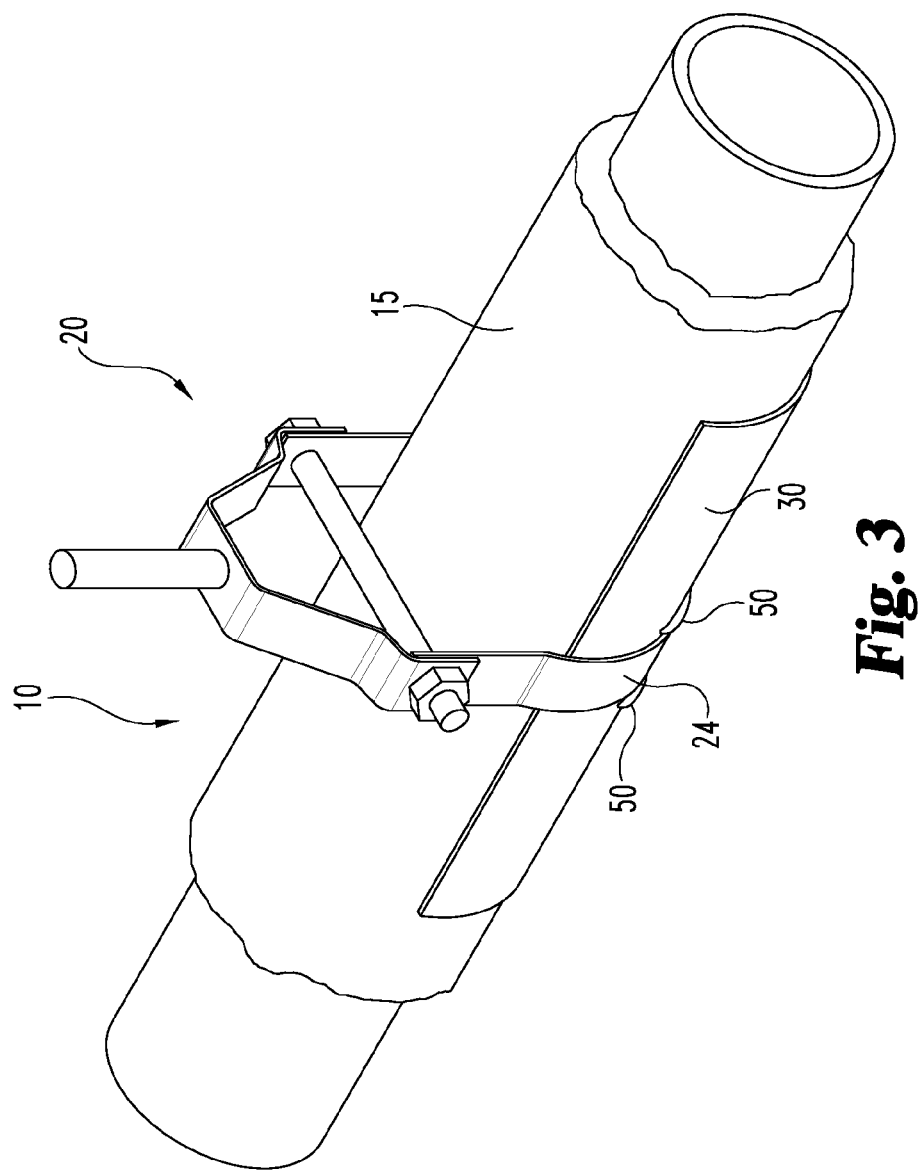
FIG. 3 illustrates a hanger assembly and saddle supporting a pipe according to a preferred embodiment of the present invention.
Figure 4:
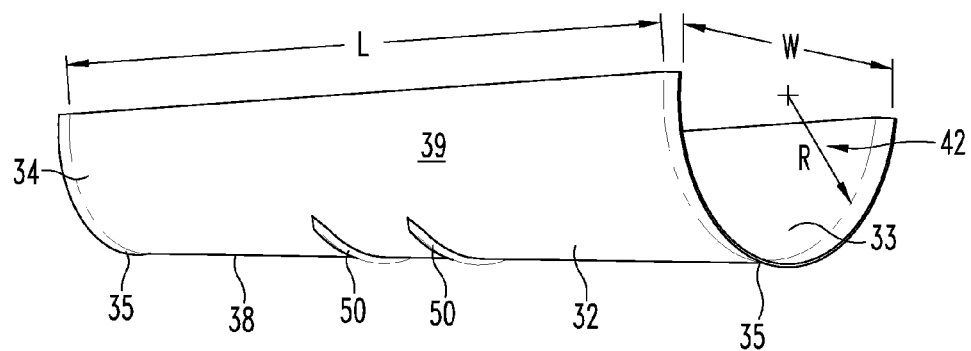
FIG. 4 is lower perspective view of an arcuate saddle according to one embodiment of the present invention.
Figure 5:
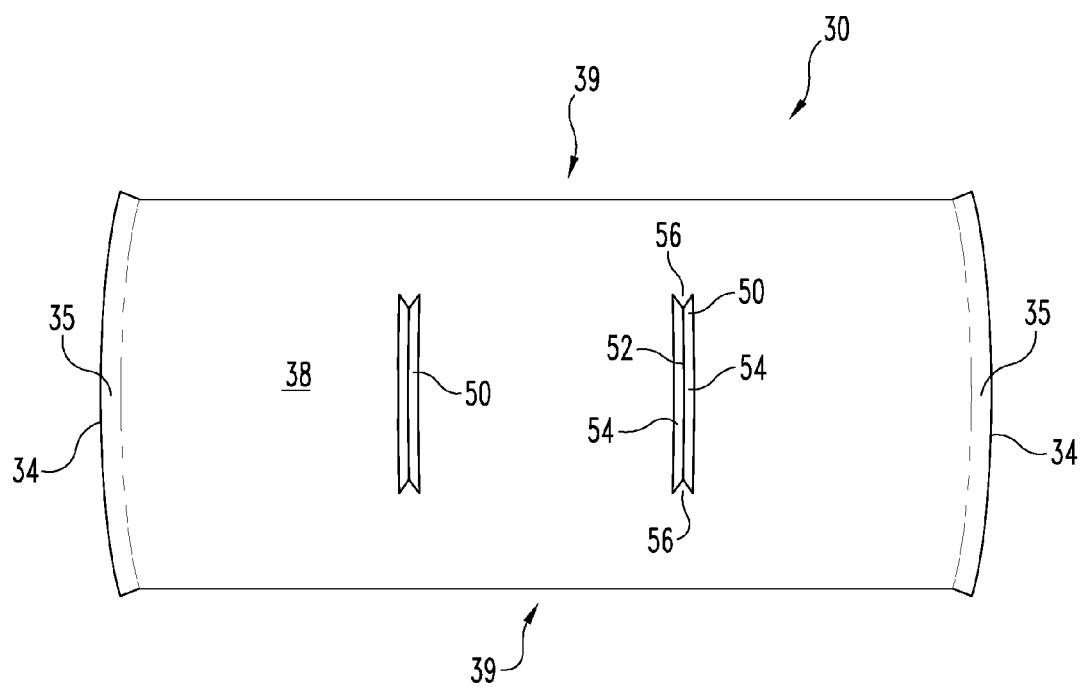
FIG. 5 is a lower view of the saddle of FIG. 4.
Figure 6:
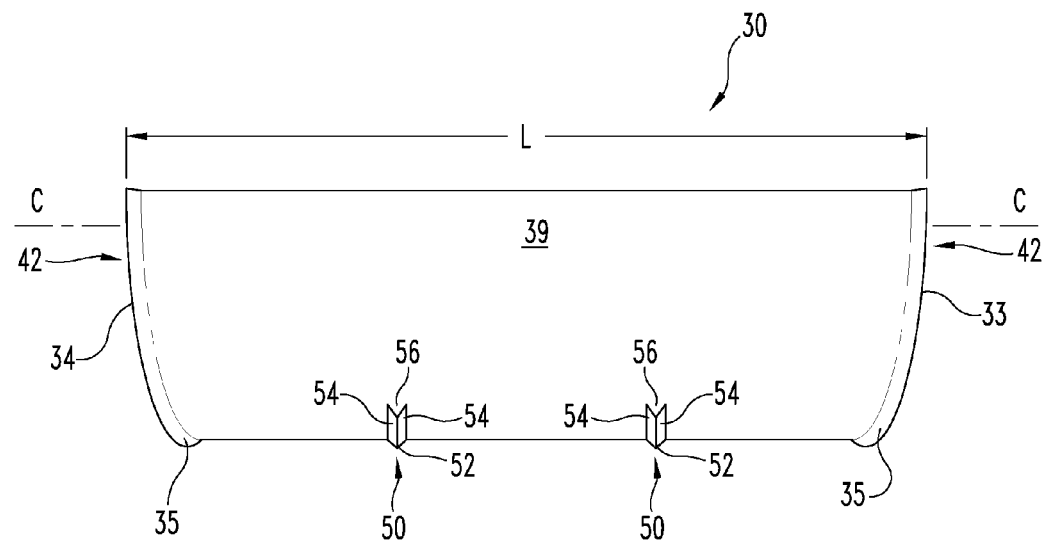
FIG. 6 is side view of the saddle of FIG. 4.
Figure 7:
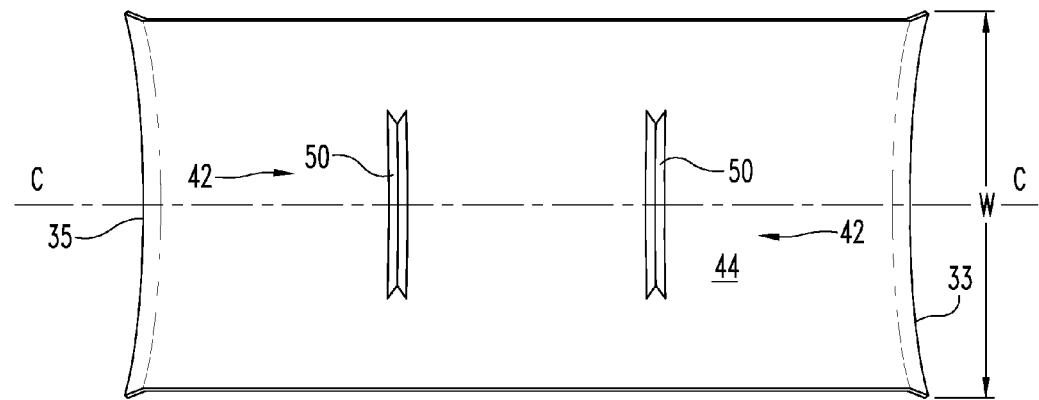
FIG. 7 is a downward or interior view of the saddle of FIG. 4.

Embodiments of the present invention relate to arcuate saddles with partial ribs typically used to anchor and suspend insulated or non-insulated pipes. As illustrated in FIGS. 2 and 3, in a typical assembly 10 a hanger assembly 20 wraps around a pipe or insulated pipe 15 with a saddle 30 situated between the lower portion of the hanger and the pipe. According to an embodiment of the present invention, partial ribs 50 on the lower face of the saddle inhibit the saddle from sliding relative to the hanger when engaged and provide strengthening force to the saddle.

Figure 1:
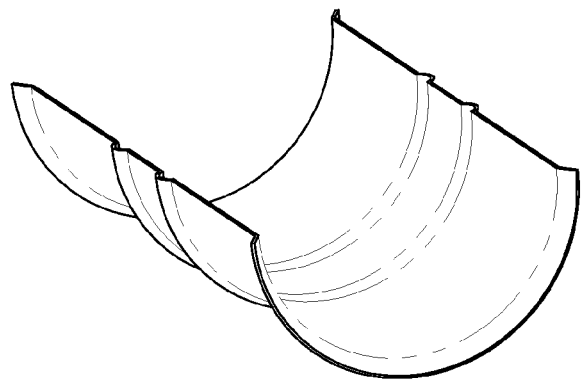
FIG. 1 is a perspective view of a prior art saddle with 180° arcuate ribs.

When putting together assembly 10, an installer takes saddle 30 and slides it through lower bracket 24 of hanger 20 either independently or with the introduction of pipe 15 into the hanger. Partial ribs 50 are generally on the lower face or side of saddle 30 and do not extend upward to the vertical sides. The vertical sides of saddle 30 have a width in a close tolerance with the interior of hanger lower bracket 24 to transfer suspension force from the pipe to the hanger once in place. Typically the ribs in a prior art saddle, such as 180° ribs shown in FIG. 1, have a higher profile and larger radius than the interior of hanger particularly on the sides, making sliding introduction of the prior art saddles into the hanger difficult. Omitting rib portions from the sides of the saddle allows the saddle to be introduced with a slight lifting above the lower hanger portion to clear the lower ribs, but without concern for side rib portions which might otherwise require lifting or twisting of the saddle relative to the hanger sides.

Partial ribs 50 according to certain preferred embodiments are considered closed at their ends, for example with the ends tapered into the face of the saddle. Closing the ends and omitting rib portions from the sides of the saddle allows the lower hanger portion to engage the sides of the saddle and pipe 15 in a flush or no-gap arrangement between the saddle side and hanger and between the saddle side and pipe and preferably with a friction fit once engaged. This flush arrangement substantially closes and seals the hanger to the saddle side and the saddle to the pipe and prevents the accumulation or retention of moisture or debris in the rib, such as water, dust, mold, or bacteria, which could accumulate in an open ended rib, such as in the 180 degree arcuate ribbed saddle of FIG. 1.

Hanger 20, for example the clevis hanger illustrated in detail in FIG. 2, typically includes an upper portion or bracket 22 which can be suspended from a building structure, a lower bracket 24 for receiving and engaging the saddle and pipe and optionally includes a pivot 26 between the upper and lower brackets to allow some relative movement of the hanger portions, if necessary due to vibration, expansion or contraction. Alternately, the hanger can be one piece or a strap which suspends a pipe and saddle.

FIGS. 4-7 illustrate saddle 30 according to one preferred embodiment. Saddle 30 is formed typically from a metal sheet 32 pressed or rolled into approximately a 180° arcuate bend about a radius R, forming a length L and a width W. Saddle 30 includes two ends 33 and 34 at opposing ends of the saddle length. Ends 33 and 34 are optionally slightly outwardly flared 35 at each end to facilitate introduction of the pipe into the saddle and to minimize any abutment of sharp edges against the pipe or insulation. The exterior face of saddle 30 includes a generally lower portion or lower face 38 and opposing vertical sides 39. "Vertical" and "lower" references herein refer to arcuate or curved portions of the saddle which may include generally vertical or horizontal tangents and are not intended to imply planar or flat portions.

The outer diameter or width W of saddle 30 is preferably sized to closely correspond to the inner diameter or width $W_C$ of the lower bracket 24 of hanger 20. As examples, pipe sizes may range from 0.5 to 24 inches. More typical saddle sizes have outer diameters of 1.5 to 12 inches, optionally available in half-inch increments, although other outer diameter sizes can be made as desired. Example lengths are 8 or 12 inches An interior channel 42 extends through the interior 44 of saddle 30 along channel axis C. In use, the interior diameter of channel 42 is sized to receive and engage an outer diameter of a corresponding pipe or insulated pipe.

Partial ribs 50 are defined on the lower face 38 of saddle 30. Ribs 50 typically have an arcuate bend corresponding in shape to the arcuate curve of lower face 38. Partial ribs 50 are generally transverse to the length L of saddle 30 and parallel to the width W. Ribs 50 preferably extend a sufficient height and width to inhibit saddle 30 from moving relative to the lower bracket 24 of hanger 20 once installed. Ribs 50 are preferably primarily oriented on lower face 38 and do not substantially extend to side portions 39. In certain preferred embodiments, the arcuate bend of ribs 50 is approximately 60° or less.

Ribs 50 each include a central peak section 52 and opposing slanted or curved sides extending from face 38 to peak 52. Peak section 52 may be sharp, blunted or rounded. Ends 56 of the ribs may be sharply defined, but preferably are tapered into saddle 30 at each end to form a closed end. Ribs 50 could be mounted to lower face 38 with an attachment process, but preferably are formed into the metal.

In one method of manufacture, a piece or "blank" of metal sheet either to be bent or pre-bent into a saddle is placed into a stamping machine which receives the piece. The stamping machine compresses the sheet between mating portions. During the compression, one piece of the press includes protruding partial ribs which stamp corresponding rib sections into the saddle. Optionally, the sheet is bent into an arcuate shape in the same step.

In an alternate method of manufacture, partially ribbed saddles can be made using a roll bending process using, for example, an Acrotech Model 1618 roll bending machine. A die 130 usable in a roll bending machine 400 (FIG. 12) is illustrated in FIGS. 8 and 9.

Die 130 includes opposing ends 131 which are engaged and driven by the roll bending machine. A central portion of the die has a length $L_D$ corresponding to the length of the saddle piece to be formed. The central portion has opposing ends 133 and 134 along length $L_D$ to form corresponding ends in the saddle. Optionally, ends 133 and 134 are flared 135 on the die to impart a flare to the end portions of the saddle.

Figure 8:
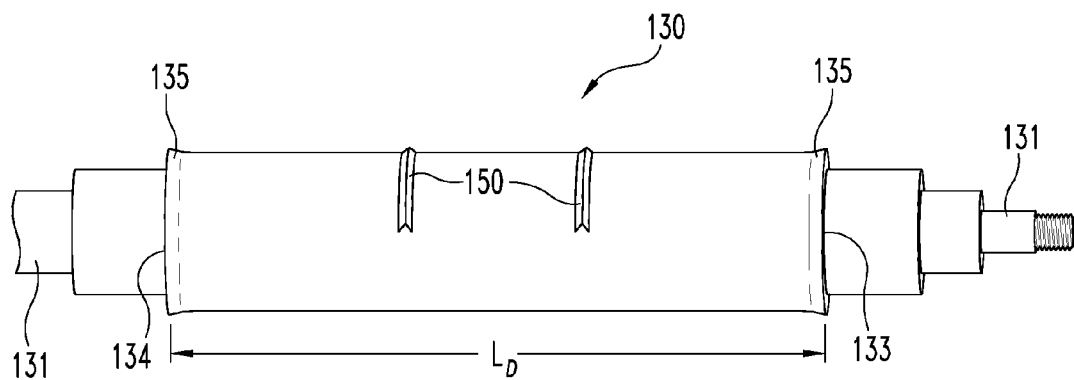
FIG. 8 is a die usable to make arcuate saddles according to embodiments of the present invention.
Figure 9:
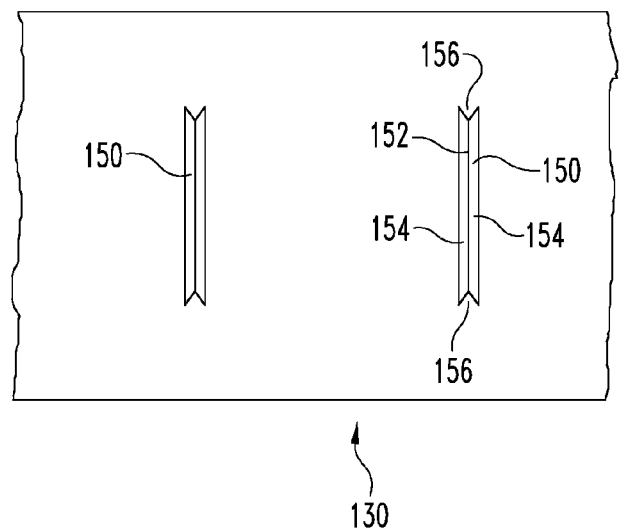
FIG. 9 is an enlarged partial view of the die of FIG. 8.
Figure 10:
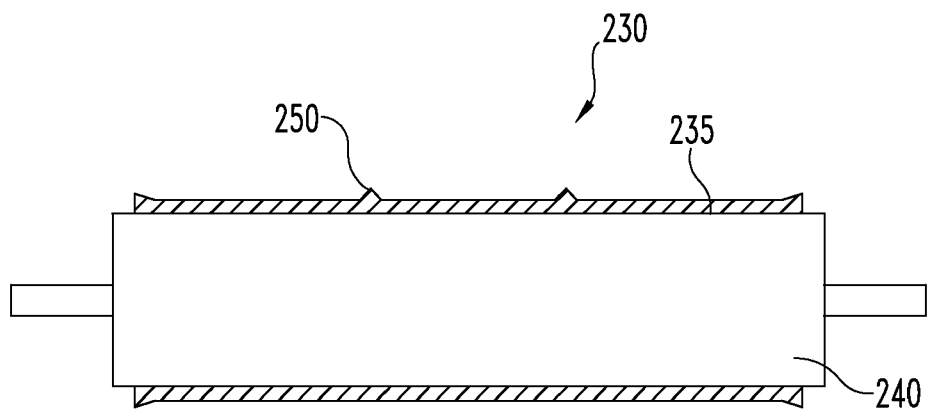
FIG. 10 is a cross-sectional view of a die assembly usable to make arcuate saddles according to embodiments of the present invention.

In the embodiment of FIGS. 8 & 9, die 130 is a solid cylinder which can be mounted at opposing ends to a roll bending machine to be driven. In an alternate embodiment shown in FIG. 10, die 230 is a two piece die with an outer sleeve 235 surrounding an inner cylinder 240. Inner cylinder 240 has opposing ends which are mountable to a roll bending machine. The outer diameter of inner cylinder 240 preferably forms a close fit with the inner diameter of outer sleeve 235 such that rotation of the inner cylinder by the machine transmits a corresponding rotation to outer sleeve 235.

Figure 11:
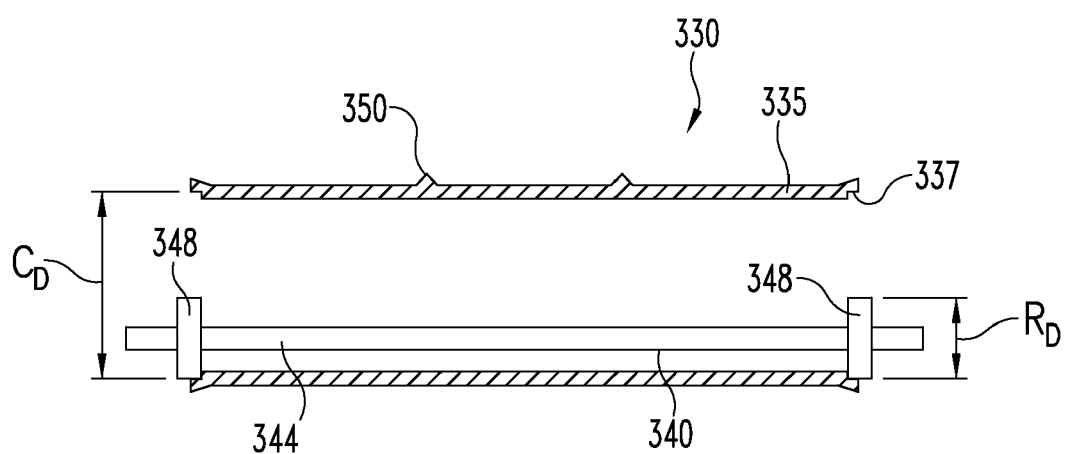
FIG. 11 is a cross-sectional view of a die assembly usable to make arcuate saddles according to embodiments of the present invention.

In a still further embodiment illustrated in FIG. 11, die 330 includes an outer sleeve 335 with an outer and inner diameter and an inner roller 340. Inner roller includes a mandrel shaft 344 with opposing ends mountable to a be driven by roll bending machine. Two bearing rollers 348 are mounted to shaft 344 and engage channels 337 defined adjacent opposing ends on the inner diameter of outer sleeve 335. As inner roller 340 is turned, it causes sleeve 335 to rotate at a rate proportional to the ratio between the channel diameter $C_D$ and the diameter $R_D$ of bearing rollers 348.

The die diameter is preferably sized to the diameter of a desired arcuate saddle, with different sizes usable for different sized saddles. By way of example only, a solid die, such as die 130, can be used for saddles up to approximately four (4) inches in diameter. A two-piece die with an inner cylinder, such as die 230, may be preferred for saddles from approximately four (4) inches in diameter to five (5) inches in diameter. A two-piece die with an inner shaft driving a sleeve, such as die 330, may be preferred for saddles with a diameter of approximately five (5) inches or larger.

The outer surface of the die defines partial ribs which press corresponding rib portions into the saddle during the roll bending process. For example, in dies 130, 230 and 330 the partial ribs are 150, 250 and 350 respectively. The ribs of die 130 are described in detail, with ribs 250 and 350 being similar yet appropriately sized to the corresponding die diameter. As shown in detail in FIG. 9, ribs 150 preferably include a transverse length with a peak 152 and opposing side portions 154. The ends of the partial ribs 156 are preferably tapered into the curve of die 130. Partial ribs 150 are preferably formed on a face of die 130 to correspond in placement to a lower portion of saddle 30, with blank portions on opposing sides of the ribs on die 130 to form corresponding non-ribbed side portions in the saddle.

Figure 12:
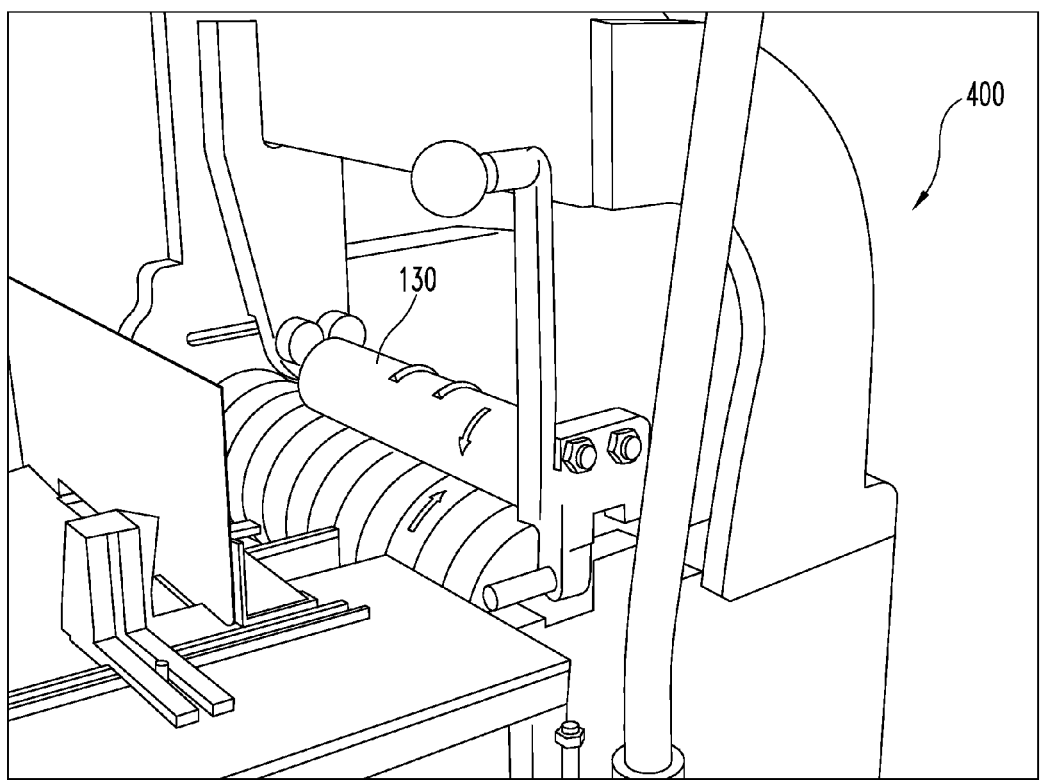
FIG. 12 is a framed view of a roll bending machine to make arcuate saddles according to embodiments of the present invention.

A portion of an example roll bending machine 400 is shown in FIG. 12. To form a piece of sheet metal into an arcuate saddle, a blank piece is preferably fed between two rollers, one of which is die 130, with the length placed to correspond to the central portion of the die. Preferably the die is arranged and timed to rotate and form the partial ribs in the lower face of the arcuate saddle while bending each saddle. One method of arranging such timing is to start the die at a specific rotational point relative to the introduction of each blank sheet to form a saddle. An alternate method uses an automated or timed feeding mechanism to introduce blanks only at specified points relative to the rotation of die 130 while the die is in continuous rotation.

Figure 13:
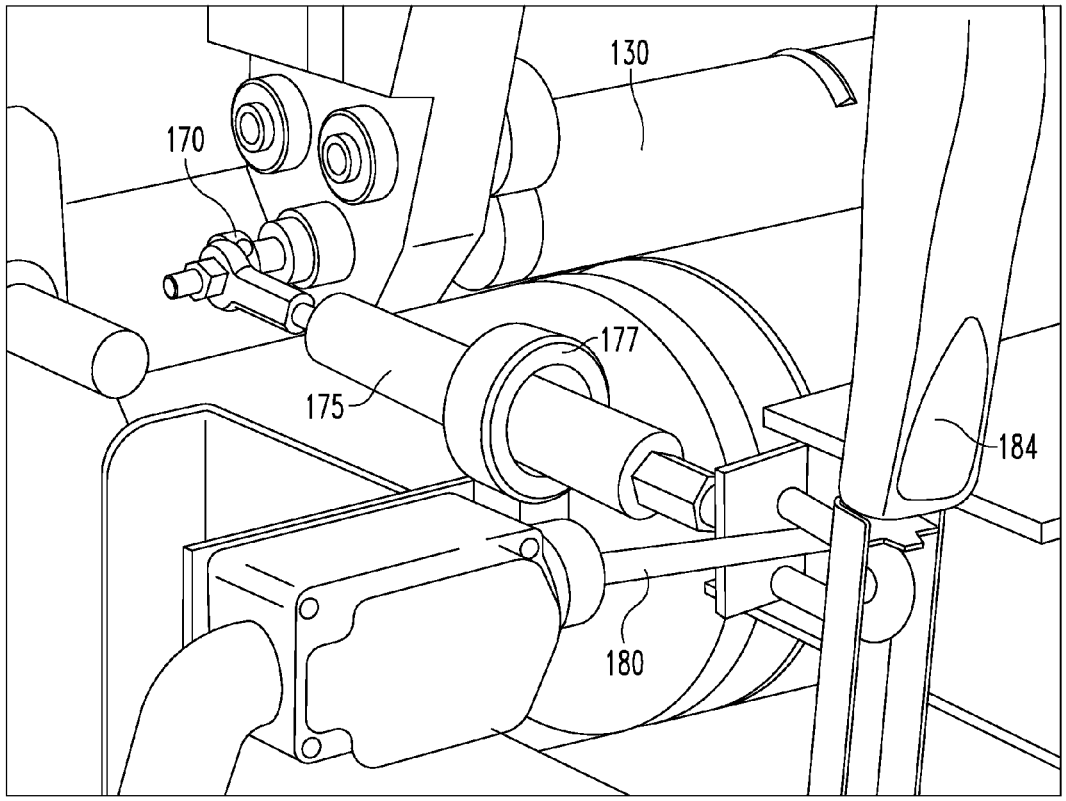
FIG. 13 is a framed view of an optional sensor assembly on the machine of FIG. 12.
Figure 14:
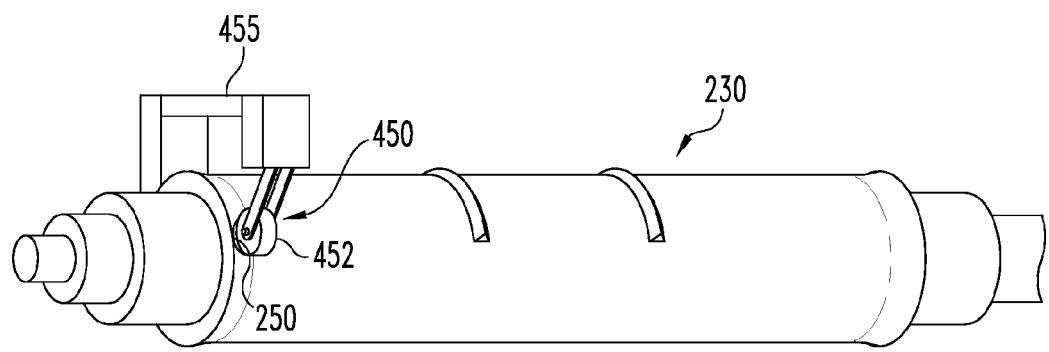
FIG. 14 is a perspective view of the die assembly of FIG. 10 with a sensor.

In certain embodiments, for example those shown in FIGS. 13 and 14, a roll bending machine incorporates a sensor to consistently start the die at a specific rotational point relative to the introduction of each blank sheet to form a saddle. The sensor can be mechanical, such as a cam, wheel or lever, or electrical such as a light sensor or an electrical circuit.

In one embodiment, illustrated with die 130 in FIG. 13, a cam 170 is mounted to an end of die 130. A lever 175 is eccentrically pivotally mounted to cam 170 offset from the die axis, and extends through a bracket 177 towards a two-position switch 180. Lever 175 is pulled and pushed through bracket 177 during rotation of die 130. In use, a saddle blank is arranged at a feed point into the roll bending die with lever 175 at its extended position relative to switch 180. The switch is then activated, for example by pushing handle 184 inward to push switch 180 to engage the roll bending machine to feed and bend the saddle blank into an arcuate saddle with rib portions while simultaneously pulling and then pushing lever 175 during the rotation cycle. When the die has made one complete revolution, lever 175 returns to its extended position and pushes switch 180 outward to disengage the rolling process. Preferably, at the end stopping point of the die rotation the protruding ribs on the die are positioned to be synchronized with the desired rib placement for when the next saddle blank is fed into the machine.

In an alternate embodiment, illustrated on die 230 in FIG. 14 yet usable in various die sizes, a registry point is defined on the die, and a sensor disengages the rolling process when the registry point reaches a desired position. In the example illustrated, die 230 includes a hole or depression 250 adjacent an end, for example on the exterior face or shoulder of sleeve or on an end face of the sleeve. A sensor 450 is arranged to detect when the hole or depression reaches a desired registry point. In one example, sensor 450 is a spring-biased wheel 452 mounted on a stalk 455 extending from machine 400. In use, the process is engaged with a manual switch or sensor when a blank is in place or with an automated feed process. The wheel 452 is pushed outward by the die face during rotation of the die, and is biased to move slightly inward to engage the hole or depression when aligned with the registry point. The slight inward movement of wheel 452 preferably disengages the rolling process. Preferably, at the end stopping point of the die rotation the protruding ribs on the die are positioned to be synchronized with the desired rib placement for when the next saddle blank is fed into the machine.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An arcuate saddle for supporting pipe, comprising:
   a saddle having a length and a width, wherein the width is formed into an arc defined by a radius;
   an interior channel defined by said saddle, said channel extending the length of said saddle said interior channel defining corresponding opposing vertical side portions and a lower face portion on an exterior face of said saddle;
   and,
   pair of protruding partial ribs on said lower face portion of exterior face, wherein said partial ribs have length direction parallel to said width and wherein the length of said partial ribs is less than said saddle width wherein each said partial rib includes a central peak section and opposing slanted sides extending from said exterior face to said peak section, and wherein the ends of said partial ribs closed and wherein the ribs provide strengthening force to the saddle, and;
   wherein said partial ribs are defined on said lower face portion substantially transverse to the length of said saddle and wherein said partial ribs do not substantially extend into said side portions.

2. The arcuate saddle of claim 1, wherein said saddle has outwardly flared portions at opposing ends of said interior channel.

3. The arcuate saddle of claim 2, wherein said saddle is formed from a piece of sheet metal.

4. The arcuate saddle of claim 1, wherein said saddle width is formed into an arc extending approximately 180 degrees.

5. The arcuate saddle of claim 4, wherein said partial ribs form an arc of approximately 60 degrees or less.

6. The arcuate saddle of claim 1, wherein the ends of said pair of partial ribs are tapered into said saddle.

7. The arcuate saddle of claim 1, in combination with a hanger having a width, wherein said pair of partial ribs are spaced apart a distance to snugly receive said hanger width between said partial ribs.

8. An arcuate saddle for supporting pipe, comprising:
   a saddle having a length and a width, wherein the width is formed into an arcuate bend defined by a radius, wherein said arcuate bend extends less than or substantially equal to 180 degrees;
   an interior channel defined by said saddle, said channel extending the length of said saddle said interior channel defining corresponding opposing vertical side portions and a lower face portion on an exterior face of said saddle; and,
   pair of protruding partial ribs on the lower face portion of the exterior face of said saddle, wherein each said partial rib includes a central peak section and opposing slanted sides extending from said exterior face to said peak section, wherein said partial ribs have an arcuate bend extending along said saddle arcuate bend and a length direction extending along said saddle arcuate bend, and wherein the degrees that said partial ribs extend is less than the arcuate bend of said saddle and wherein the ends of said partial ribs are closed and wherein the ribs provide strengthening force to the saddle.

9. The arcuate saddle of claim 8, wherein said partial ribs form an arcuate bend of approximately 60 degrees or less.

10. The arcuate saddle of claim 8, wherein said partial ribs form an arcuate bend length in a ratio of approximately one-third or less to the arcuate bend of said saddle.

11. The arcuate saddle of claim 8, wherein said closed ends are tapered into side portions of said saddle.

12. The arcuate saddle of claim 8, wherein said saddle has outward flared portions at opposing ends of said interior channel.

13. An arcuate saddle for supporting pipe, comprising:
   a saddle with a length and a width formed into an arc defined by a radius and wherein said saddle defines an interior channel extending the length of said saddle, said interior channel defining corresponding opposing vertical side portions and a lower face portion on an exterior face of said saddle;
   and,
   a pair of partial ribs with closed ends protruding from said exterior face, wherein each said partial rib includes a central peak section and opposing slanted sides extending from said exterior face to said peak section and wherein the ends of said partial ribs are closed;
   wherein said partial ribs are defined on said lower face portion substantially transverse to the length of said saddle and wherein said partial ribs do not substantially extend into said side portions and wherein the ribs provide strengthening force to the saddle.

14. The arcuate saddle of claim 13, wherein said partial ribs have an arcuate bend along the arc of said saddle.

15. The arcuate saddle of claim 14, wherein the closed ends of said pair of partial ribs are tapered into said side portions.

* * * * *

UNITED STATES PATENT AND TRADEMARK OFFICE
CERTIFICATE OF CORRECTION

PATENT NO. : 7,677,505 B2
APPLICATION NO. : 11/767091
DATED : March 16, 2010
INVENTOR(S) : Mack Deichman It is certified that error appears in the above-identified patent and that said Letters Patent is hereby corrected as shown below:

In Claim 1, column 5, line 47, please add --a-- before the words "pair of protruding partial ribs" so that it reads: "a pair of protruding partial ribs".

In Claim 1, column 5, line 54, please add --are-- between the words "ribs" and "closed" so that it reads: "ribs are closed".

In Claim 8, column 6, line 21, please add --a-- before the words "pair of protruding partial ribs" so that it reads: "a pair of protruding partial ribs".

Signed and Sealed this

Twentieth Day of April, 2010

David J. Kappos
*Director of the United States Patent and Trademark Office*